United States Patent
Koster et al.

(10) Patent No.: US 7,698,509 B1
(45) Date of Patent: Apr. 13, 2010

(54) SNOOPING-BASED CACHE-COHERENCE FILTER FOR A POINT-TO-POINT CONNECTED MULTIPROCESSING NODE

(75) Inventors: Michael J. Koster, Freemont, CA (US); Christopher L. Johnson, San Francisco, CA (US); Brian W. O'Krafka, Austin, TX (US)

(73) Assignee: Oracle America, Inc., Redwood Shores, CA (US)

( * ) Notice: Subject to any disclaimer, the term of this patent is extended or adjusted under 35 U.S.C. 154(b) by 873 days.

(21) Appl. No.: 10/889,952

(22) Filed: Jul. 13, 2004

(51) Int. Cl.
    *G06F 12/00* (2006.01)
(52) U.S. Cl. .................. 711/146; 711/144; 711/145; 711/128; 711/119; 711/E12.032; 711/E12.042
(58) Field of Classification Search .................. 711/146
    See application file for complete search history.

(56) References Cited

U.S. PATENT DOCUMENTS

| | | | | |
|---|---|---|---|---|
| 6,018,763 A | * | 1/2000 | Hughes et al. | 709/213 |
| 6,055,610 A | * | 4/2000 | Smith et al. | 711/156 |
| 6,671,780 B1 | * | 12/2003 | Lu et al. | 711/136 |
| 6,721,848 B2 | * | 4/2004 | Gaither | 711/122 |
| 6,810,467 B1 | * | 10/2004 | Khare et al. | 711/146 |
| 6,959,364 B2 | * | 10/2005 | Safranek et al. | 711/146 |
| 2002/0087811 A1 | * | 7/2002 | Khare et al. | 711/146 |
| 2002/0126704 A1 | * | 9/2002 | Cam et al. | 370/503 |
| 2003/0009626 A1 | * | 1/2003 | Gruner et al. | 711/130 |
| 2004/0068616 A1 | * | 4/2004 | Tierney et al. | 711/141 |
| 2004/0230752 A1 | * | 11/2004 | Blake et al. | 711/147 |
| 2005/0044195 A1 | * | 2/2005 | Westfall | 709/223 |
| 2005/0228952 A1 | * | 10/2005 | Mayhew et al. | 711/133 |

FOREIGN PATENT DOCUMENTS

EP 889403 A2 * 1/1999

* cited by examiner

*Primary Examiner*—Reginald G Bragdon
*Assistant Examiner*—Aracelis Ruiz
(74) *Attorney, Agent, or Firm*—Osha • Liang LLP (57) ABSTRACT

A multiprocessing node has a plurality of point-to-point connected microprocessors. Each of the microprocessors is also point-to-point connected to a filter. In response to a local cache miss, a microprocessor issues a broadcast for the requested data to the filter. The filter, using memory that stores a copy of the tags of data stored in the local cache memories of each of the microprocessors, relays the broadcast to those/microprocessors having copies of the requested data. If the snoop filter memory indicates that none of the microprocessors have a copy of the requested data, the snoop filter may either (i) cancel the broadcast and issue a message back to the requesting microprocessor, or (ii) relay the broadcast to a connected multiprocessing node.

15 Claims, 11 Drawing Sheets

SNOOPING-BASED CACHE-COHERENCE FILTER FOR A POINT-TO-POINT CONNECTED MULTIPROCESSING NODE

BACKGROUND OF INVENTION

Figure 1:
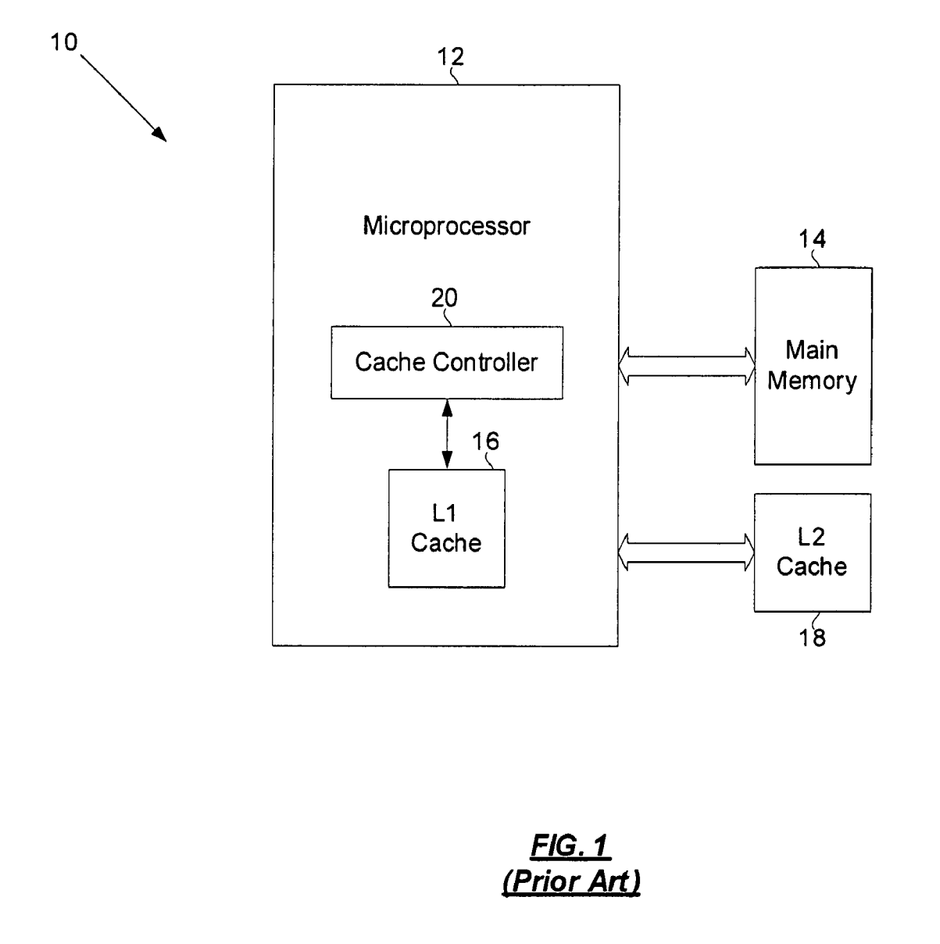
FIG. 1 shows a typical computer system.

As shown in FIG. 1, a typical computer system 10 includes at least a microprocessor 12 and a main memory 14. The main memory 14 contains data for use by the microprocessor 12 to perform the operations of the computer system 10. However, because the speed of the microprocessor 12 is typically significantly faster than that of the main memory 14, memory of smaller size and faster speed (referred to and known as "cache" memory) is often implemented to allow the microprocessor 12 to access frequently and/or recently requested data faster than it would otherwise take to obtain such data from the main memory 14.

Still referring to FIG. 1, the microprocessor 12 has an "on-chip" (i.e., on the same semiconductor die as the microprocessor 12), or "L1," cache memory 16 and an "off-chip," or "L2," cache memory 18. When the microprocessor 12 requests data, a cache controller 20 causes the L1 cache memory 16 to be searched for the requested data, and if that search does not "hit" (i.e., a cache "miss" occurs), the L2 cache memory 18 is searched for the requested data. If the requested data is not found in the cache memories 16, 18, the requested data is retrieved from the relatively slow main memory 14.

Those skilled in the art will recognize that a microprocessor may have any number of cache memory levels, which are typically referred to by number in order of decreasing proximity to the microprocessor. Further, those skilled in the art will recognize that any number of cache memories may be on-chip and any number of cache memories may be off-chip.

Figure 2:
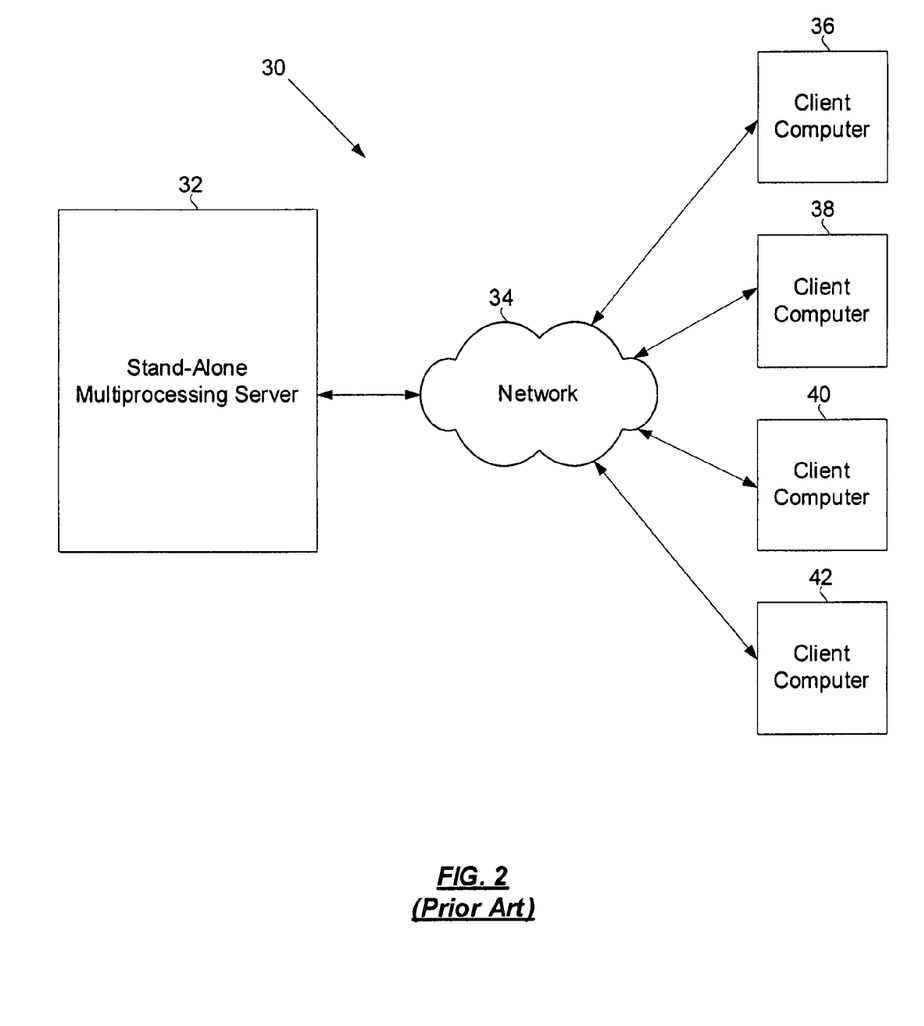
FIG. 2 shows a typical computer network.

A computer system, like the one shown in FIG. 1, may be used as a system that services requests from and provides data to other computers connected over a network. Such a client-server network model 30 is shown in FIG. 2. In FIG. 2, a stand-alone server 32 is connected over a network 34 to several client computers 36, 38, 40, 42. The server 32 may be used to store data, programs, etc. for use by the client computers 36, 38, 40, 42. Those skilled in the art will recognize that the server 32 may also be used to manage and control the client computers 36, 38, 40, 42.

Figure 3:
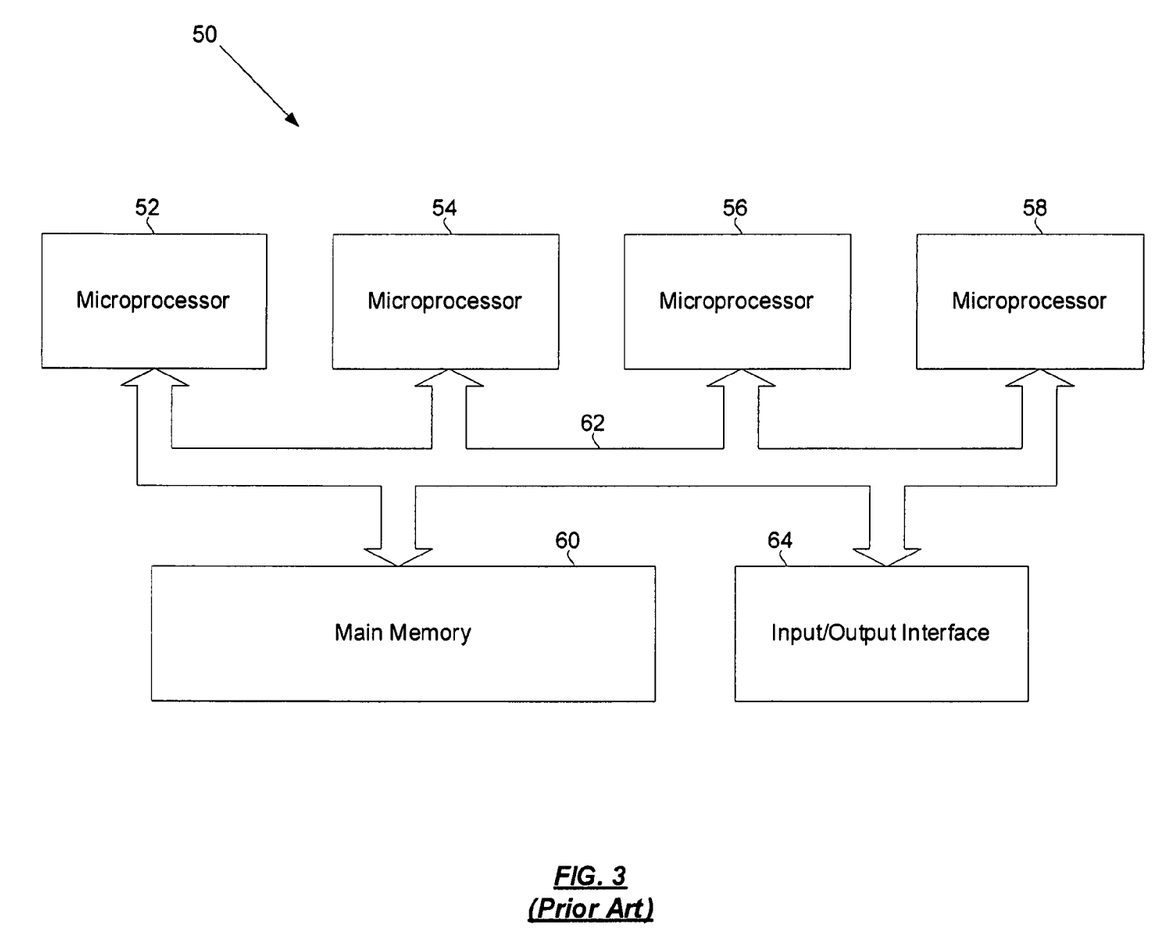
FIG. 3 shows a typical multiprocessor computer system.

Although some computer systems, like the one shown in FIG. 1, have a single microprocessor 12 (such a computer system referred to and known as a "uniprocessor" computer system), other computer systems, like the server 32 shown in FIG. 2, may be formed of multiple microprocessors. FIG. 3 shows such a multiprocessing computer system 50.

The computer system 50 of FIG. 3 is shown as having multiple microprocessors 52, 54, 56, 58. The microprocessors 52, 54, 56, 58 communicate with one another and with a main memory 60 over a network (e.g., a bus) 62. The network 62 is implemented as a set of bits that propagate data in parallel from one location to another. The "bandwidth" of the network 62 (i.e., the number of bits propagated in parallel by the network 62) is an important factor in the overall performance of the computer system 50. FIG. 3 also shows an input/output interface 64 that is connected to the network 62 and serves to input and output data to other portions of the computer system 50 and/or components external to the computer system 50.

Those skilled in the art will recognize that the multiprocessing computer system 50 of FIG. 3 may represent a particular type of multiprocessing computer system used in networking and known and referred to as a symmetric multiprocessing (SMP) computer system. A SMP computer system is one in which multiple microprocessors share, for example, the same memory and input/output interface. Those skilled in the art will also recognize that a SMP computer system may share the same operating system. Although the multiple microprocessors in a SMP computer system share the same resources, each microprocessor may act independently. For example, while one microprocessor searches for data in memory, other microprocessors may update the memory and perform other tasks, thereby increasing the ability of the SMP computer system to handle intensive networking demands.

Those skilled in the art will recognize that SMP computer systems provide good scalability in that additional microprocessors may be added or removed with minimal changes to the system. Despite the benefits of SMP computer systems, bottlenecks may occur when several microprocessors on a board share a single memory bus. Rather than put too many microprocessors on the same SMP board, designers of network elements often distribute applications across a networked cluster of SMP boards, where each board has its own memory, I/O interface, and operating system.

SUMMARY OF INVENTION

According to one aspect of one or more embodiments of the present invention, a computer system comprises: a first integrated circuit having a local cache memory; a second integrated circuit connected to the first integrated circuit; and a filter connected by point-to-point interconnect to the first integrated circuit and the second integrated circuit, where, in response to a miss for requested data in the local cache memory, a broadcast for the requested data is propagated to the snoop filter, and where the snoop filter is configured to relay the broadcast to the second microprocessor dependent on whether the second integrated circuit has a copy of the requested data.

According to another aspect of one or more embodiments of the present invention, a method of performing computer system operations comprises: requesting data from a cache memory of a first integrated circuit; if the requested data is not found in the cache memory, issuing a broadcast for the requested data to a filter point-to-point connected to the first integrated circuit; and if an address of the requested data is found in the filter, relaying the broadcast to a second integrated circuit associated with the address.

According to another aspect of one or more embodiments of the present invention, a computer network comprises: a cluster of individual SMP computer systems that are connectable using point-to-point interconnect, at least one of the individual SMP computer systems having a filter, where, in response to a cache miss for requested data in an integrated circuit of the at least one of the individual SMP computer systems, the integrated circuit is configured to issue a broadcast for the requested data to the filter, and where the filter is configured to relay the broadcast to another integrated circuit in the at least one of the individual SMP computer systems if the another integrated circuit has a copy of the requested data According to another aspect of one or more embodiments of the present invention, a computer system comprises a plurality of integrated circuits, a filter point-to-point connected to the plurality of integrated circuits and having a memory that stores addresses of data stored in cache memories of the plurality of integrated circuits, and memory comprising instructions to: requesting data from a cache memory of one of plurality of integrated circuits; if the requested data is not found in the cache memory, issuing a broadcast for the requested data to the filter; and if an address of the requested data is found in the filter, relaying the broadcast to another one of the plurality of integrated circuits, the another one of the plurality of integrated circuits being associated with the address.

Other aspects and advantages of the invention will be apparent from the following description and the appended claims.

DETAILED DESCRIPTION

In a SMP computer system, such as that shown in FIG. 3, each microprocessor has its own cache memory (see discussion of cache memories above with reference to FIG. 1). Thus, because a particular cache memory data item acted upon by one microprocessor may cause the copy of that data item to differ from other copies of that data item stored in the cache memories of the various microprocessors in a SMP computer system, "cache-coherency" techniques are implemented to ensure that the local cache memory of each microprocessor is consistent with respect to values that are stored in the cache memories of other microprocessors in the SMP computer system.

Cache-coherence problems arise in SMP computer systems when more than one microprocessor cache memory holds a copy of a data item. One type of cache-coherency technique known and referred to as a "snooping" relies on all cache memories to monitor a common network (e.g., a bus) that connects microprocessors to memory. In other words, a snooping-based cache-coherency technique depends on the ability of cache memories to observe every transaction on a network (e.g., a bus) common to the cache memories.

Figure 4:
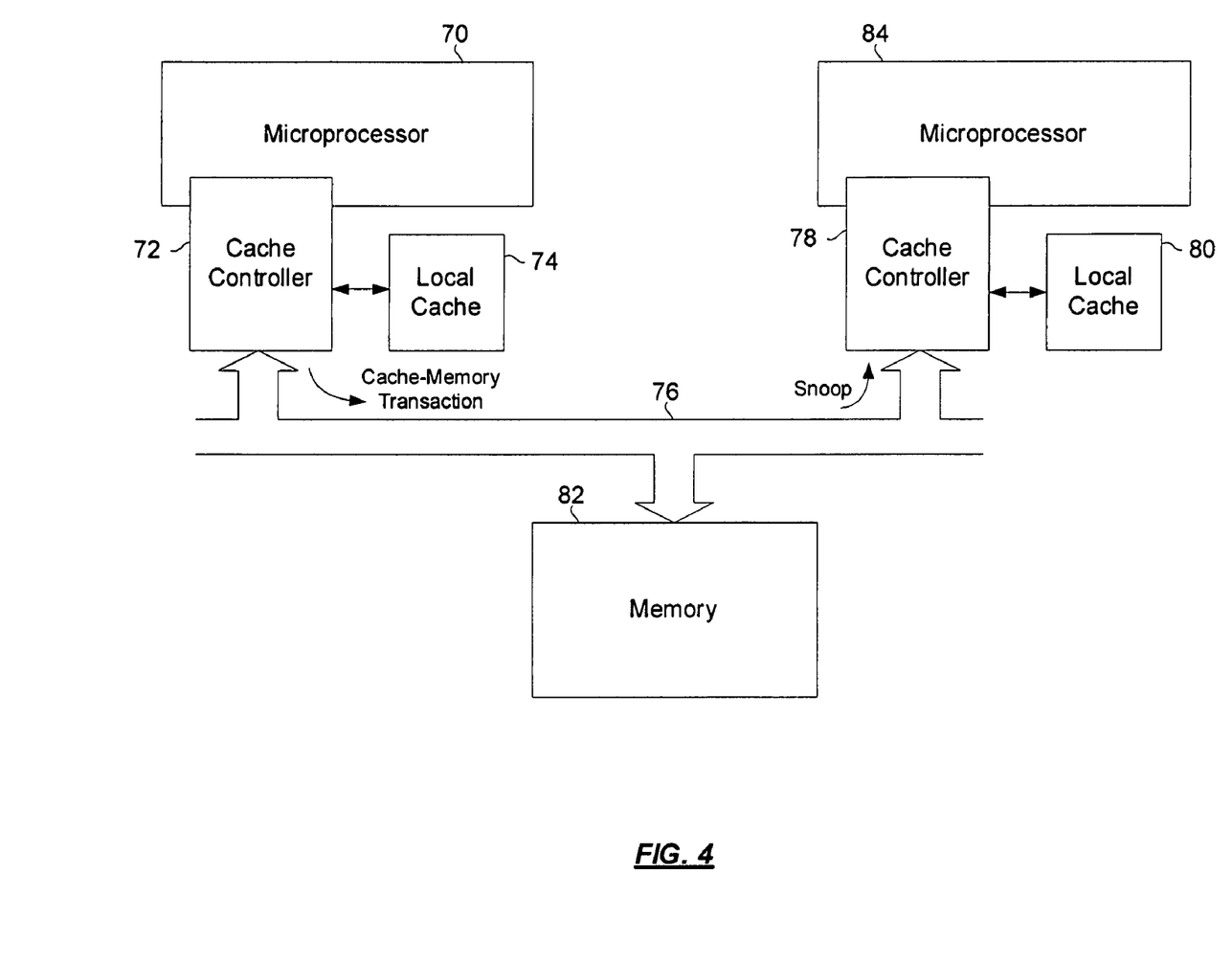
FIG. 4 shows a snooping cache-coherent multiprocessor computer system.

Now referring to FIG. 4, when microprocessor 70 requests data, a cache controller 72 local to microprocessor 70 searches for the requested data in a cache memory 74 local to microprocessor 70. If the requested data is not found in the local cache memory 74, the cache controller 72 broadcasts a data request on a network (e.g., a bus) 76 connected to other cache controllers (e.g., cache controller 78) (others not shown). The cache controllers (e.g., cache controller 78) "snoop" on the network 76 to monitor all transactions on the network 76. If a particular cache memory (e.g., cache memory 80 associated with microprocessor 84) has the data requested by the requesting cache controller 72, the cache controller (e.g., cache controller 78) associated with the cache memory (e.g., cache memory 80) having the requested data forwards (i.e., returns) the requested data to the requesting cache controller 72, which, in turn, updates its associated cache memory 74 with the returned requested data and provides the returned requested data to requesting microprocessor 70. Alternatively, if the requested data is not held in any of the cache memories 74, 80, a copy of the requested data in the main memory 82 is returned to and used by the requesting microprocessor 70.

Further, a cache controller, connected to the network 76 that observes data being written from one cache memory to another may invalidate or update its own copy of that data. The next time the cache controller's microprocessor requests that data, the most recent value of the data is provided to the microprocessor, either because its local cache memory has the most recent value of the data or through obtaining that data by generating a data request on the network 76.

Those skilled in the art will recognize that although a snooping-based cache-coherency technique obtains data relatively quickly (i.e., has relatively low latency), such a technique consumes relatively high bandwidth due to the parallel broadcast nature of its requests. As a result, snooping-based cache-coherency techniques are typically limited to small-scale systems.

Figure 5:
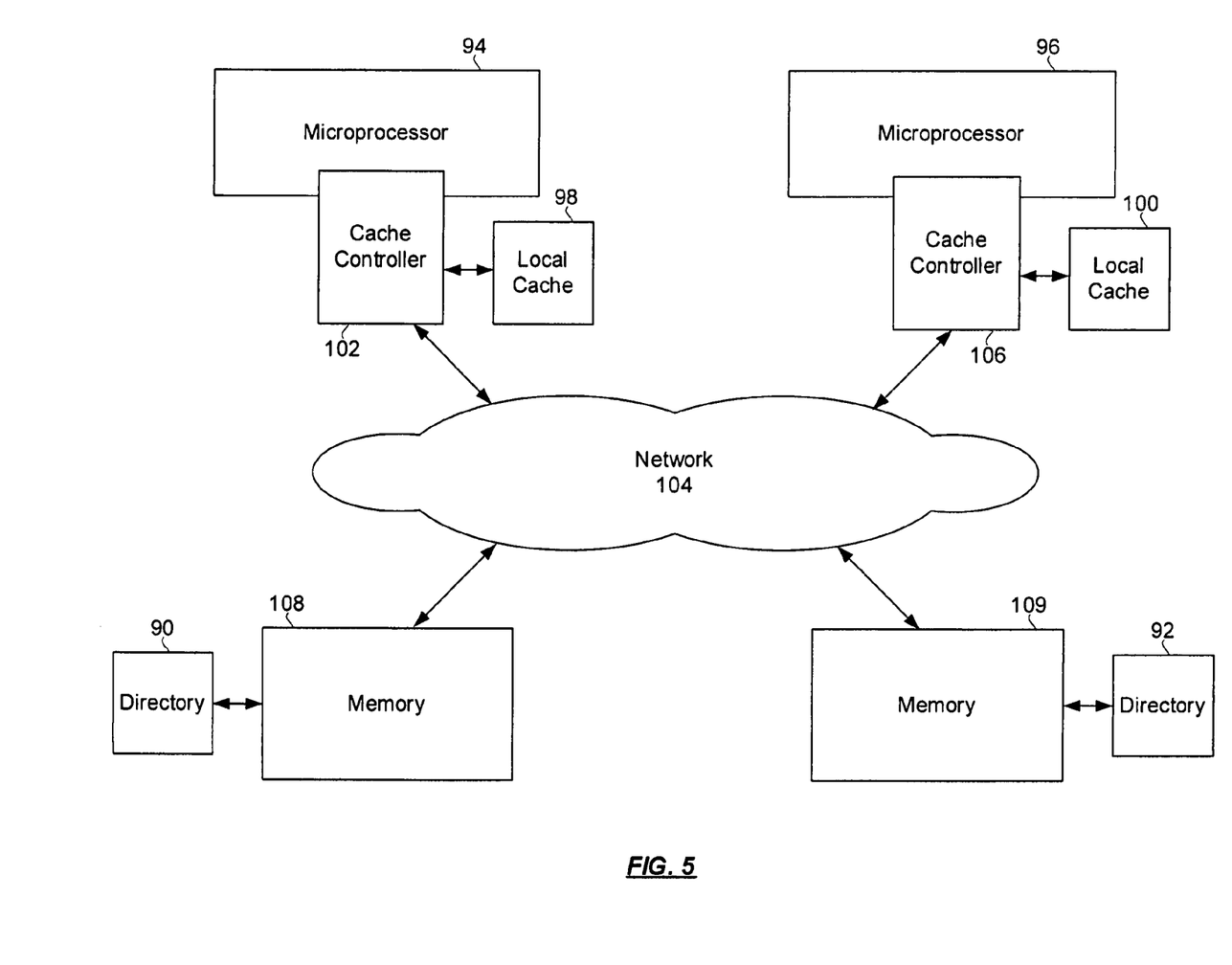
FIG. 5 shows a directory-based cache-coherent multiprocessor computer system.

Now referring to FIG. 5, in another type of cache-coherency technique known and referred to as "directory-based cache-coherence," when a cache miss occurs in a local cache memory (e.g., local cache memory 98 or 100) of a microprocessor (e.g., microprocessor 94 or 96), a cache controller (e.g., cache controller 102 or 106) issues a data request over a network 104 to a "home" directory (e.g., directory 90 or 92) of the requested data, the "home" directory typically being associated with the "home" memory (e.g., memory 108 or 109) of the requested data. The "home" directory may indicate to the cache controller a location of the requested data. Alternatively, if the "home" directory indicates that no other cache memories connected to the network 104 have the requested data, the requested data may be returned by the "home" memory of the requested data.

One advantage of directory-based cache-coherency techniques with respect to snooping-based cache-coherency techniques is that they keep track of which microprocessor nodes have copies of particular data, thereby eliminating the need for a high-bandwidth data request broadcast. This is valuable on read misses because a data request is subsequently satisfied either by the directory indicating the location of a copy of the requested data or by accessing the main memory.

Further, because directory-based cache-coherent techniques may rely on low-bandwidth interconnect rather than on high-bandwidth networks (e.g., buses) that are necessary for broadcasting in snooping-based cache-coherency techniques, directory-based cache-coherent SMP computer systems may be scalable to a large number of microprocessors. However, the indirection overheads associated with directory queries make directory-based cache-coherency techniques slower (i.e., have higher latency) than snooping-based cache-coherency techniques (e.g., a directory-based cache-coherence technique may often require three times the number of "hops" otherwise taken in a snooping-based cache-coherence technique).

For example, in a snooping-based cache-coherency technique, upon a cache miss, one set of parallel messages is broadcast over a bus and one response message with the requested data is sent back to the requesting processing node.

On the other hand, in a directory-based cache-coherent technique, upon a cache miss, a data request message is sent to the home processing node, the home processing node forwards the data request message to the owning cache memory, and the owning cache memory returns the requested data to the requesting processing node. Thus, generally, in snooping-based cache-coherency techniques, there are more messages in parallel (relatively low average latency), while in directory-based cache-coherency techniques, there are more messages in series (relatively high average latency).

Often, several small SMP servers (e.g., a near-commodity modular shelf server) are connected together to provide increased processing capabilities. Due to the limited bandwidth of the cables connecting the servers, directory-based cache-coherency techniques are required to ensure cache-coherence among the servers. However, as discussed above, directory-based cache-coherency techniques have relatively high average latency compared to snooping-based cache-coherency techniques.

Figure 6:
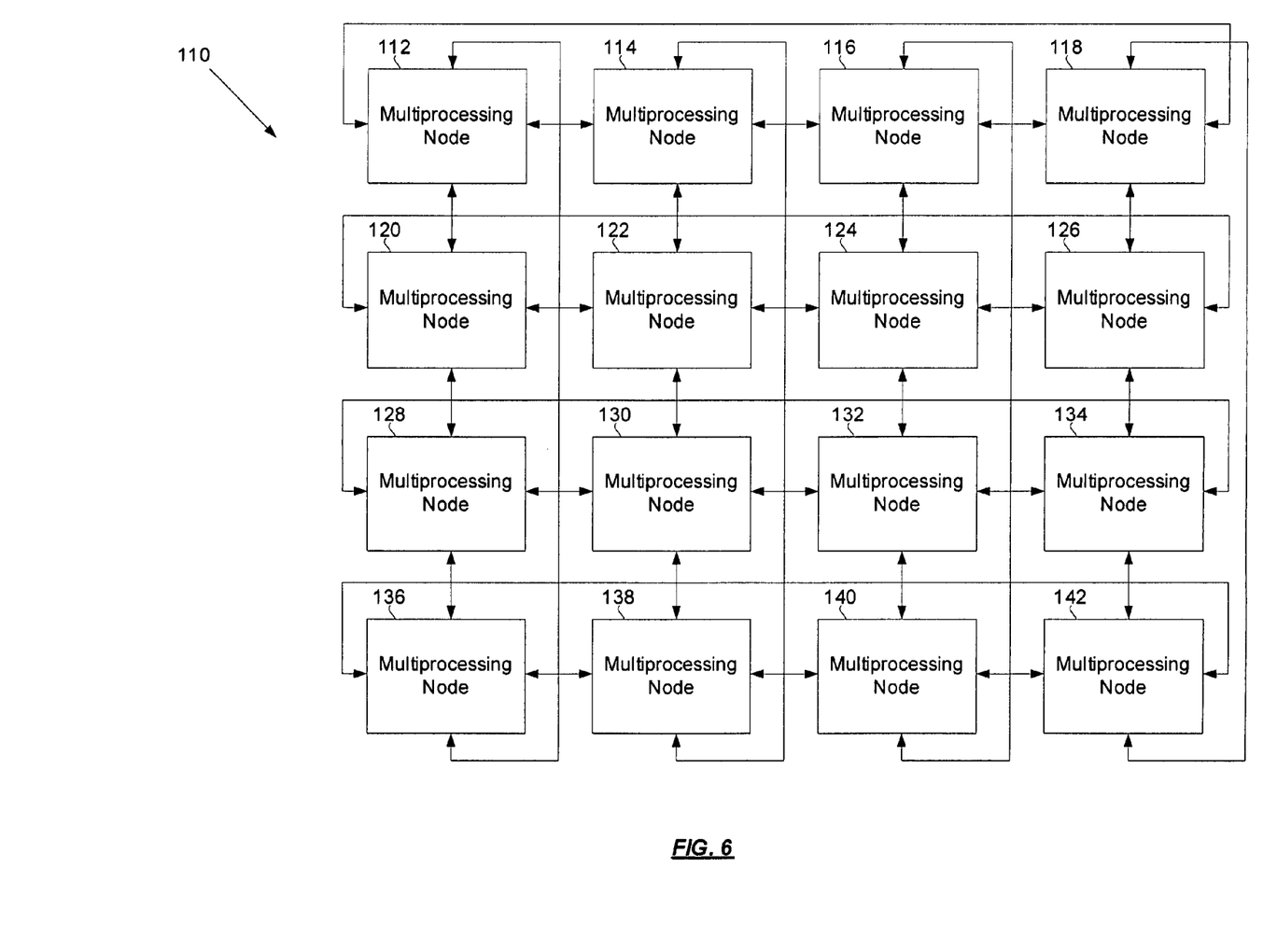
FIG. 6 shows a computer system in accordance with an embodiment of the present invention.

Embodiments of the present invention relate to a technique for implementing a snooping-based cache-coherence filter device (also referred to herein as "snoop filter") in a point-to-point connected multiprocessing node. FIG. 6 shows an exemplary computer system 110 in accordance with an embodiment of the present invention. In FIG. 6, a plurality of multiprocessing nodes 112, 114, 116, 118, 120, 122, 124, 126, 128, 130, 132, 134, 136, 138, 140, 142 are point-to-point connected using high-bandwidth interconnect (shown but not labeled). Particularly, each multiprocessing node 112, 114, 116, 118, 120, 122, 124, 126, 128, 130, 132, 134, 136, 138, 140, 142 is connected to an adjacent multiprocessing node (in FIG. 6, each peripheral multiprocessing node is shown as being connected to the opposite peripheral multiprocessing node, e.g., multiprocessing node 112 is connected to multiprocessing node 118). In one or more other embodiments of the present invention, a multiprocessing node may be connected to a non-adjacent multiprocessing node. Further, a multiprocessing node is not limited to a server and may be any type of computer system.

In one or more embodiments of the present invention, high-bandwidth interconnect for point-to-point connected multiprocessing nodes may be implemented using interconnect technologies such as, for example, Infiniband or PCI Express. In one or more other embodiments of the present invention, high-bandwidth interconnect used to point-to-point connect multiprocessing nodes may have a bandwidth greater than that of 16-bit 1 GHz interconnect.

Further, in one or more embodiments of the present invention, point-to-point interconnect may be used in cabling a plurality of multiprocessing nodes (e.g., near-commodity shelf servers) together. Moreover, in one or more embodiments of the present invention, point-to-point interconnect may be used to connect a plurality of multiprocessing nodes to a passive backplane.

Figure 7:
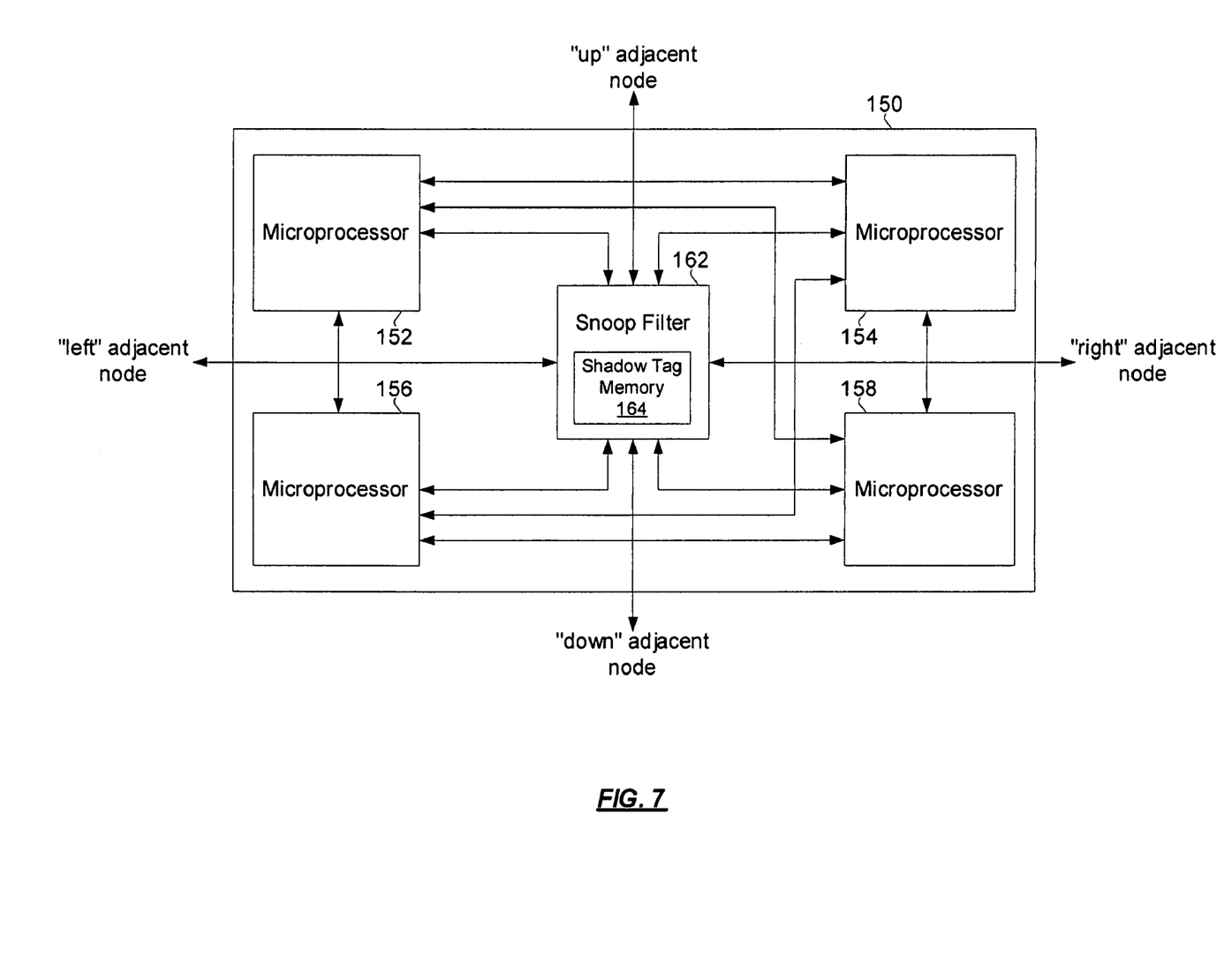
FIG. 7 shows a portion of a computer system in accordance with an embodiment of the present invention.

FIG. 7 shows an exemplary multiprocessing node 150 in accordance with an embodiment of the present invention. In FIG. 7, the multiprocessing node 150 has four microprocessors 152, 154, 156, 158. However, in one or more other embodiments of the present invention, a multiprocessing node may have any number of microprocessors. In FIG. 7, each of the microprocessors 152, 154, 156, 158 is connected to a snoop filter 162 via high-bandwidth point-to-point interconnect. The snoop filter 162 may be connected over high-bandwidth point-to-point interconnect to one or more snoop filters (not shown) of connected multiprocessing nodes (not shown). Further, each microprocessor 152, 154, 156, 158 may be connected, using point-to-point interconnect, to every other microprocessor 152, 154, 156, 158 in the multiprocessing node 150 for, for example, chip-to-chip communication.

Further, although the snoop filter 162 in FIG. 7 is shown as being connected to adjacent nodes, in one or more other embodiments of the present invention, a snoop filter may be connected to one or more non-adjacent nodes.

The snoop filter 162 observes snooping-based cache-coherence broadcasts for requested data and the responses thereto. At least partly in order to determine whether to forward or cancel snooping-based cache-coherence broadcasts, the snoop filter 162 has local state memory (referred to and shown in FIG. 7 as "shadow tag memory") 164 that stores the tags of data stored in the local cache memories (e.g., "L2" cache memories) (not shown) of each of the microprocessors 152, 154, 156, 158. In other words, the shadow tag memory 164 has a copy of the tags of data stored in the local cache memories of the microprocessors 152, 154, 156, 158.

By having the shadow tag memory 164, the snoop filter 162 forwards a received broadcast for requested data (by one of the microprocessors 152, 154, 156, 158 or from another multiprocessing node (not shown)) to a particular one of the microprocessors 152, 154, 156, 158 only if its shadow tag memory 164 indicates that the particular microprocessor has a copy of the requested data. Otherwise, if the snoop filter 162 determines that none of the microprocessors 152, 154, 156, 158 has a copy of the requested data, the snoop filter 162 is configured to cancel any subsequent relays of the broadcast to the microprocessors 152, 154, 156, 158, and instead, sends a message back to the requesting microprocessor (or multiprocessing node (not shown)) indicating that none of the other microprocessors (or none of the microprocessors) in the multiprocessing node 150 has a copy of the requested data.

In one or more embodiments of the present invention, a shadow tag memory may be optimistically maintained as a set-associative cache. Further, in one or more embodiments of the present invention, the set-associative cache may use a MOESI (Modified Owner Exclusive Shared Invalid) cache-coherency protocol.

Figure 8:
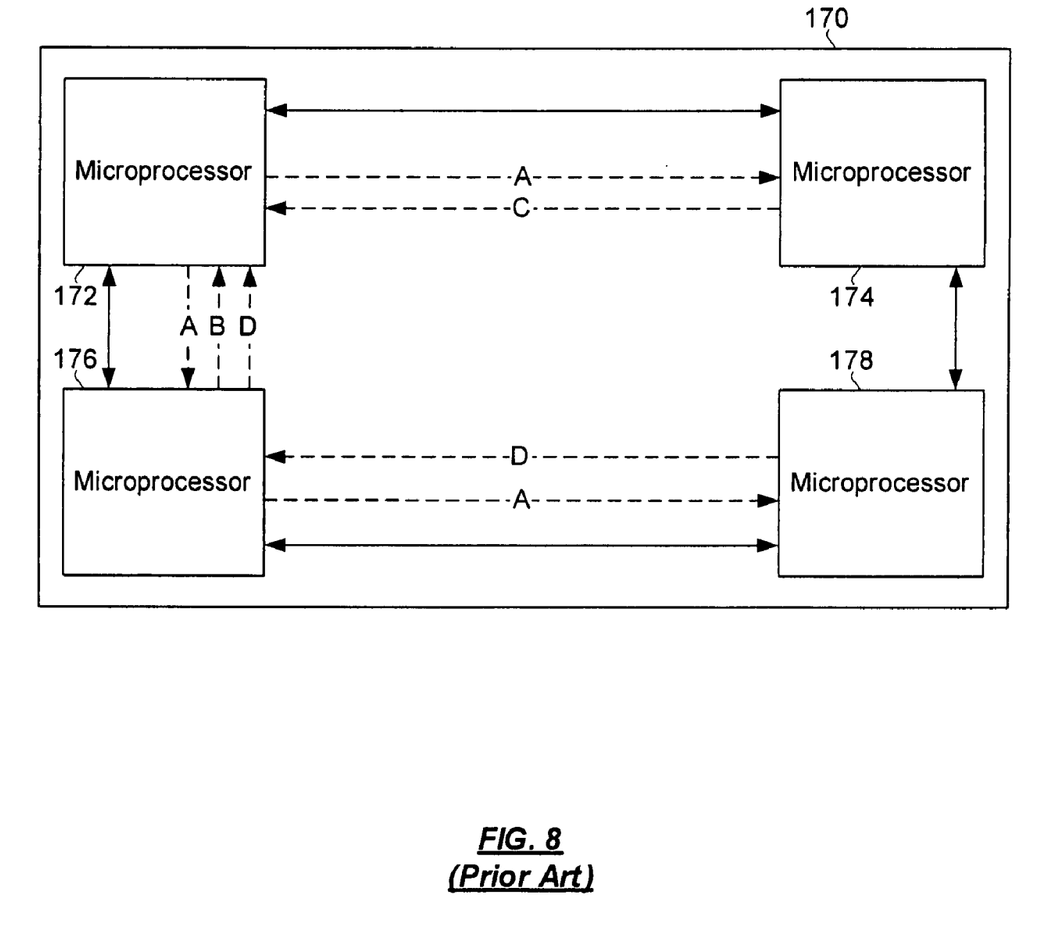
FIG. 8 shows a flow of messages in a portion of a typical computer system.

At least partly to illustrate the difference between an implementation of a multiprocessing node that uses a snoop filter in accordance with one or more embodiments of the present invention and one that does not, FIG. 8 shows an exemplary flow of messages in a multiprocessing node 170 (having microprocessors 172, 174, 176, 178) that does not have a snoop filter. In FIG. 8, microprocessor 172 ("the requesting microprocessor") issues a broadcast for requested data. The broadcast is initially forwarded as request A to microprocessors 174, 176 and is then relayed to microprocessor 178 from microprocessor 176. In response to request A, microprocessors 174, 176, 178 send their responses B, C, D, respectively, back to the requesting microprocessor 172.

Those skilled in the art will recognize that because in the case shown in FIG. 8, if only microprocessor 174 has a copy of the requested data, the bandwidth of the multiprocessing node 170 used for responses A and D is unnecessarily consumed.

Figure 9:
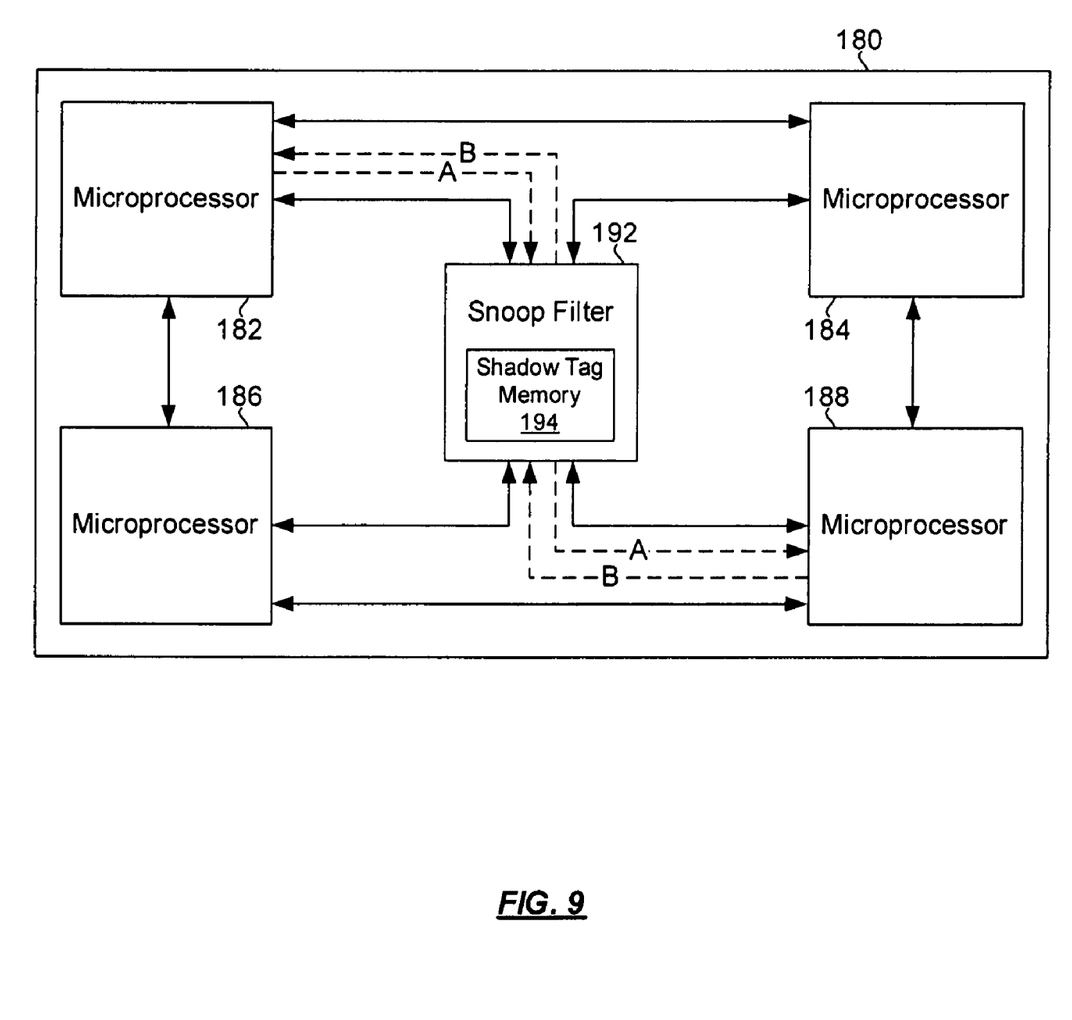
FIG. 9 shows an exemplary flow of messages in a portion of a computer system in accordance with an embodiment of the present invention.

However, as discussed above with reference to FIG. 7, by using a snoop filter in accordance with one or more embodiments of the present invention, requests for data are sent only to those microprocessors having copies of the requested data. For example, FIG. 9 shows an exemplary flow of messages in a multiprocessing node 180 in accordance with an embodiment of the present invention.

The multiprocessing node 180 is shown as having a snoop filter 192 that is connected via high-bandwidth interconnect (shown, but not labeled) to microprocessors 182, 184, 186, 188. In FIG. 9, microprocessor 182 ("the requesting microprocessor") issues a broadcast A for requested data. Due to the presence of the snoop filter 192, broadcast A is first routed to the snoop filter 192. Referencing its shadow tag memory 194, the snoop filter 192 determines whether any of microprocessors 184, 186, 188 have a copy of the data requested in broadcast A. In the exemplary case shown in FIG. 9, the snoop filter 192, referencing its shadow tag memory 194, determines that microprocessor 188 has a copy of the data requested in broadcast A, and thus, the snoop filter 192 forwards broadcast A to microprocessor 188. In response to broadcast A being forwarded to microprocessor 188, microprocessor 188 issues a response B (having a copy of the requested data) that is forwarded back to the requesting microprocessor 182 through the snoop filter 192.

By forwarding response B through the snoop filter 192, the snoop filter 192 is able to update its shadow tag memory 194. However, in one or more other embodiments of the present invention, a response from a microprocessor may be routed directly back to a requesting microprocessor.

Figure 10:
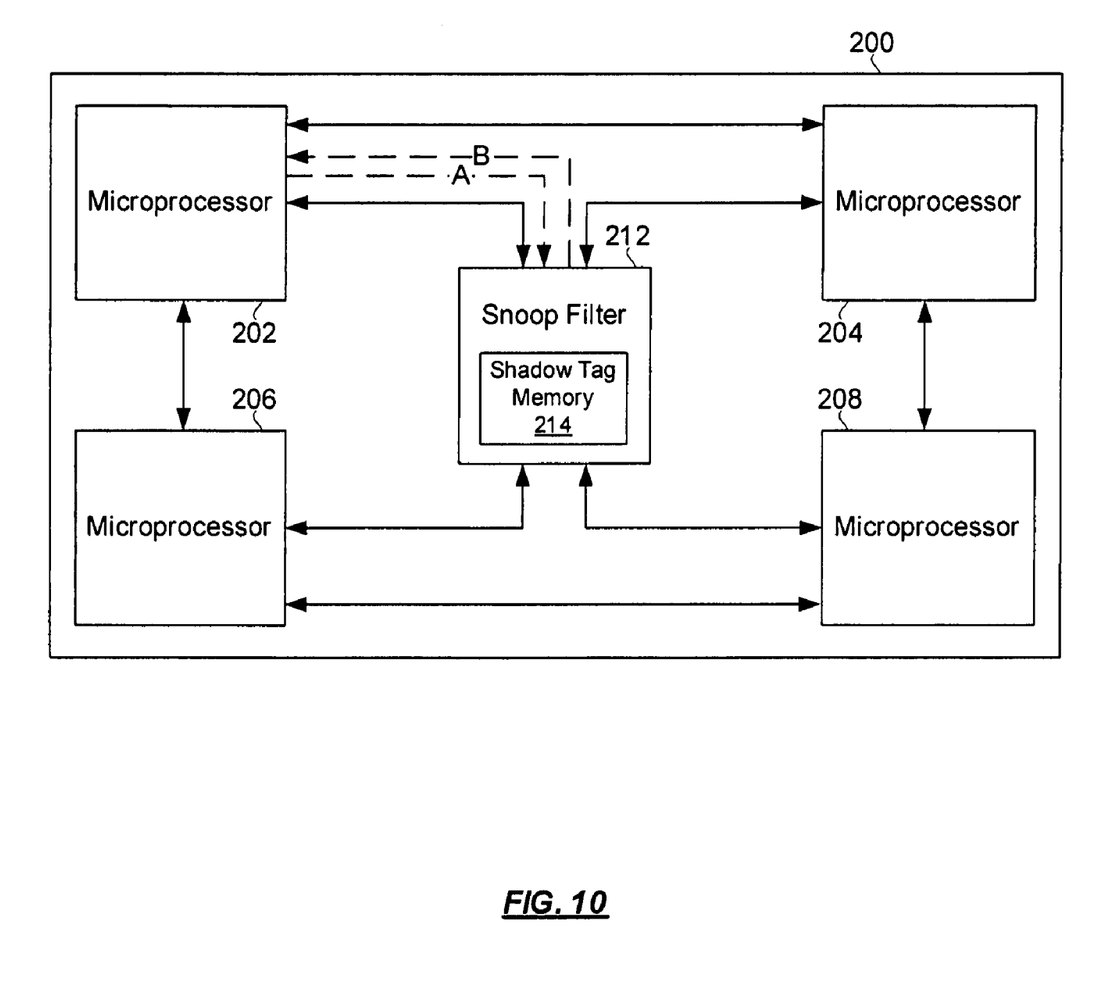
FIG. 10 shows an exemplary flow of messages in a portion of a computer system in accordance with an embodiment of the present invention.

FIG. 10 shows another exemplary flow of messages in a multiprocessing node 200 in accordance with an embodiment of the present invention. The multiprocessing node 200 has a snoop filter 212 that is connected via high-bandwidth interconnect (shown, but not labeled) to microprocessor 202, 204, 206, 208. In FIG. 10, microprocessor 202 issues a broadcast A for requested data. The broadcast A is first routed to the snoop filter 212, which, in turn, checks its shadow tag memory 214 to determine whether any of the microprocessors 204, 206, 208 have a copy of the data requested in broadcast A. In the exemplary case shown in FIG. 10, the snoop filter 212, based on its shadow tag memory 214, determines that none of the microprocessors 204, 206, 208 have a copy of the data requested in broadcast A. Thus, in this case, the snoop filter 192 discards broadcast A and sends a response B to the requesting microprocessor 202 indicating that none of the microprocessors 204, 206, 208 have the requested data.

In one or more embodiments of the present invention, in the event that the requested data cannot be found within a particular multiprocessing node (e.g., 200), the broadcast may forwarded by the snoop filter 212 to connected multiprocessing nodes. For example, FIG. 11 shows an exemplary flow of messages in connected multiprocessing nodes in accordance with an embodiment of the present invention.

Figure 11:
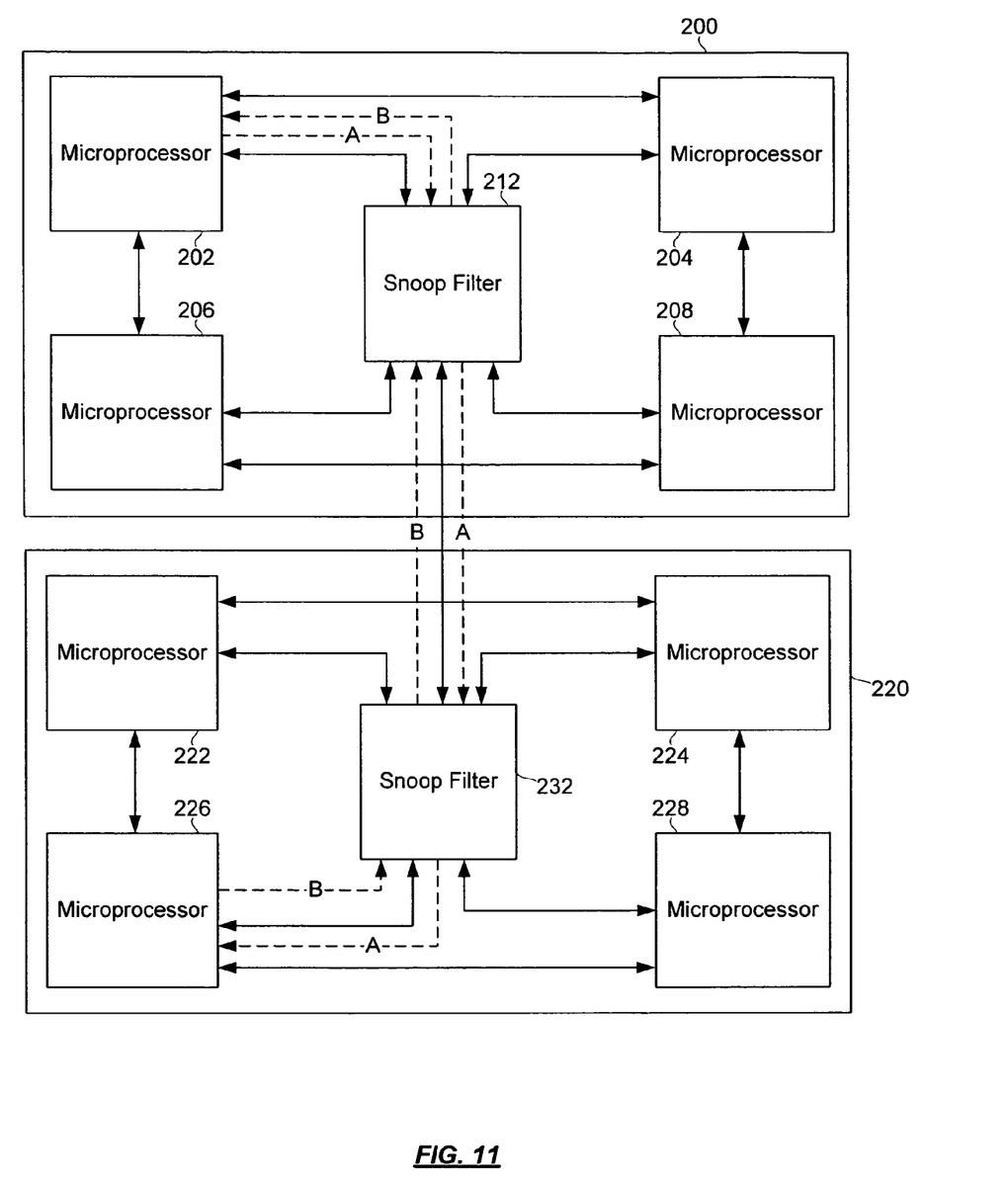
FIG. 11 shows an exemplary flow of messages in a portion of a computer system in accordance with an embodiment of the present invention.

In FIG. 11, a multiprocessing node 200 has point-to-point connected microprocessors 202, 204, 206, 208 that are point-to-point connected to snoop filter 212. The multiprocessing node 200 is connected to another multiprocessing node 220 that has point-to-point microprocessors 222, 224, 226, 228 that are point-to-point connected to snoop filter 232. When snoop filter 212 determines that none of the microprocessors 204, 206, 208 have a copy of the data requested in broadcast A by microprocessor 202 ("the requesting microprocessor"), the snoop filter 212 forwards broadcast A to snoop filter 232.

Then, snoop filter 232 searches its shadow tag memory (not shown) to determine whether any of the microprocessors 222, 224, 226, 228 connected to it has a copy of the data requested in broadcast A. In the exemplary case shown in FIG. 11, the snoop filter 232 finds that microprocessor 226 has a copy of the data requested in broadcast A, and thus, forwards broadcast A to microprocessor 226. In response, microprocessor 226 issues a response B (having the requested data) back to the snoop filter 232, which, in turn, relays response B (having a copy of the requested data) back to the "requesting" snoop filter 212, which then forwards response B back to the requesting microprocessor 202.

Those skilled in the art will recognize that by implementing a snoop filter as discussed above with reference to FIGS. 9-11, relays of broadcasts for requested data and responses thereto may be reduced, thereby reducing the overall bandwidth consumption of a particular system.

Advantages of the present invention may include one or more of the following. In one or more embodiments of the present invention, a snoop filter implemented in a multiprocessing node may improve overall system performance.

In one or more embodiments of the present invention, because a broadcast for requested data is initially routed through a snoop filter, unnecessary message relays of the broadcast may be eliminated, thereby reducing bandwidth consumption and improving latency.

In one or more embodiments of the present invention, because a snoop filter only propagates a broadcast for requested data to those microprocessors having copies of the requested data, bandwidth consumption that would otherwise be consumed by unnecessary responses may be saved. Further, latency may be improved by not having to wait for unnecessary responses.

In one or more embodiments of the present invention, a snoop filter may improve the latency of near-commodity shelf servers that are point-to point connected together to behave as a SMP computer system by not issuing unnecessary "downstream" relays of a broadcast for requested data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
 a first processor configured to broadcast a data request following a cache miss associated with a first local cache memory;
 a second processor associated with a second local cache memory;
 a first snoop filter operatively connected to the first processor and the second processor, wherein the first snoop filter comprises a first shadow tag memory storing only a copy of a plurality of tags in the first local cache memory and the second local cache memory, wherein the copy of the plurality of tags identifies data stored in the first local cache memory and the second local cache memory;
 a third processor associated with a third local cache memory;
 a second snoop filter operatively connected to the third processor and comprising a second shadow tag memory, wherein the first snoop filter is configured to relay the data request received from the first processor to the second snoop filter based on a comparison between the data request and the copy of the plurality of tags in the first shadow tag memory and receive a response from the second snoop filter based on the data request,
 wherein the first processor, the second processor, and the first snoop filter are associated with a first multiprocessing node (MPN), and
 wherein the second snoop filter and the third processor are associated with a second MPN operatively connected to the first MPN;
 a third MPN comprising a third snoop filter, wherein the third MPN is operatively connected to the first MPN; and
 a fourth MPN comprising a fourth snoop filter, wherein the fourth MPN is operatively connected to the first snoop filter, wherein the first MPN, the second MPN, the third MPN, and the fourth MPN are associated with a grid topology.

2. The system of claim 1, wherein at least two oppositely positioned peripheral multiprocessing nodes are directly connected in the grid topology.

3. The system of claim 1, wherein the second snoop filter is configured to forward the data request to the third processor based on the second shadow tag memory.

4. The system of claim 3, wherein the response originates from the second snoop filter and indicates the data request cannot be satisfied.

5. The system of claim 1, wherein at least one selected from a group consisting of the first local cache memory, the second local cache memory is maintained using a MOESI cache-coherency protocol.

6. The system of claim 1, wherein at least one selected from a group consisting of the first local cache memory and the second local cache memory is a set-associative cache.

7. The system of claim 1, wherein the second MPN is operatively connected to the first MPN by a first direct link, the third MPN is operatively connected to the first MPN by a second direct link, and the fourth MPN is operatively connected to the first MPN by a third direct link.

8. A method comprising:
identifying a cache miss associated with a first local cache memory;
generating a data request based on the cache miss, wherein the data request is generated by a first processor associated with the first local cache memory;
forwarding, using a microprocessor, the data request to a first snoop filter operatively connected to a second processor associated with a second local cache memory, wherein the first snoop filter comprises a shadow tag memory storing only a copy of a plurality of tags in the first local cache memory and the second local cache memory, wherein the copy of the plurality of tags identifies data stored in the first local cache memory and the second local cache memory;
broadcasting, using the microprocessor, the data request from the first snoop filter to a second snoop filter based on a comparison between the data request and the copy of the plurality of tags in the shadow tag memory; and
receiving a response to the data request from the second snoop filter,
wherein the first local cache memory, the first processor, the second local cache memory, the second processor, and the first snoop filter are associated with a first multiprocessing node (MPN),
wherein the first MPN is operatively connected to a second MPN comprising a second snoop filter,
wherein the first MPN is further operatively connected to a third MPN comprising a third snoop filter,
wherein the first MPN is further operatively connected to a fourth MPN comprising a fourth snoop filter, and
wherein the first MPN, the second MPN, the third MPN, and the fourth MPN are associated with a grid topology.

9. The method of claim 8, wherein at least two oppositely positioned peripheral MPNs are directly connected in the grid topology.

10. The method of claim 8, further comprising:
forwarding the response to the first processor.

11. The method of claim 8, further comprising:
forwarding the data request to a third processor operatively connected to the second snoop filter,
wherein the third processor is associated with a third local memory cache and the second MPN.

12. The method of claim 11, further comprising:
generating the response by the second snoop filter, wherein the response indicates the data request cannot be satisfied.

13. The method of claim 8, wherein the first MPN and the second MPN are symmetric multiprocessing computer systems.

14. The method of claim 8, wherein at least one selected from a group consisting of the first local cache memory and the second local cache memory is maintained using a MOESI cache-coherency protocol.

15. The method of claim 8, wherein the second MPN is operatively connected to the first MPN by a first direct link, the third MPN is operatively connected to the first MPN by a second direct link, and the fourth MPN is operatively connected to the first MPN by a third direct link.

* * * * *

UNITED STATES PATENT AND TRADEMARK OFFICE
CERTIFICATE OF CORRECTION

PATENT NO.       : 7,698,509 B1
APPLICATION NO.  : 10/889952
DATED            : April 13, 2010
INVENTOR(S)      : Michael J. Koster It is certified that error appears in the above-identified patent and that said Letters Patent is hereby corrected as shown below:

Title page, item (57), under "Abstract" column 2, line 8, delete "those/microprocessors" and insert -- those microprocessors --, therefor.

In column 2, line 58, after "data" insert -- . --.

Signed and Sealed this
First Day of March, 2011

David J. Kappos
*Director of the United States Patent and Trademark Office*